Sept. 1, 1964   B. DARREL ETAL   3,147,391
ANGULAR ACCELEROMETER
Filed March 27, 1961   4 Sheets-Sheet 4
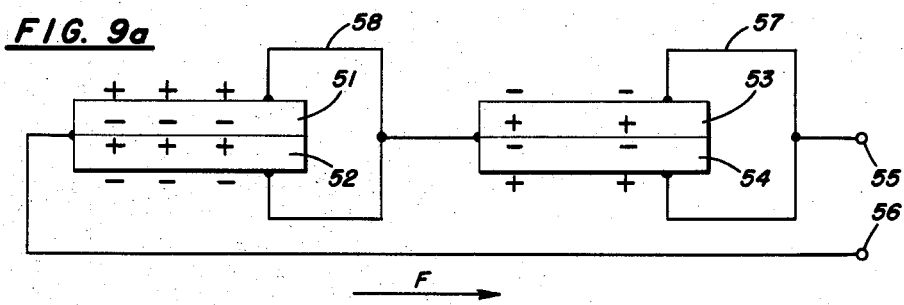
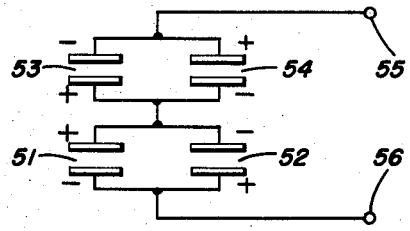
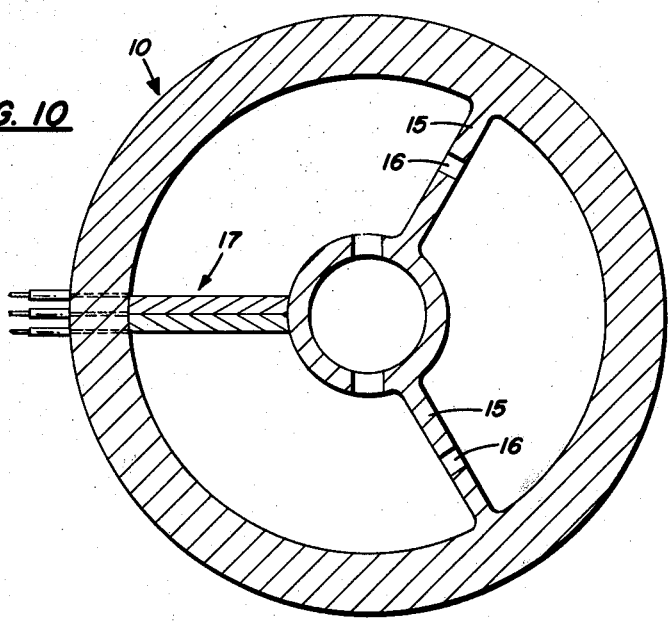
INVENTORS
BERNARD DARREL
PAUL B. BOSWELL
BY
ATTORNEYS United States Patent Office 3,147,391
Patented Sept. 1, 1964

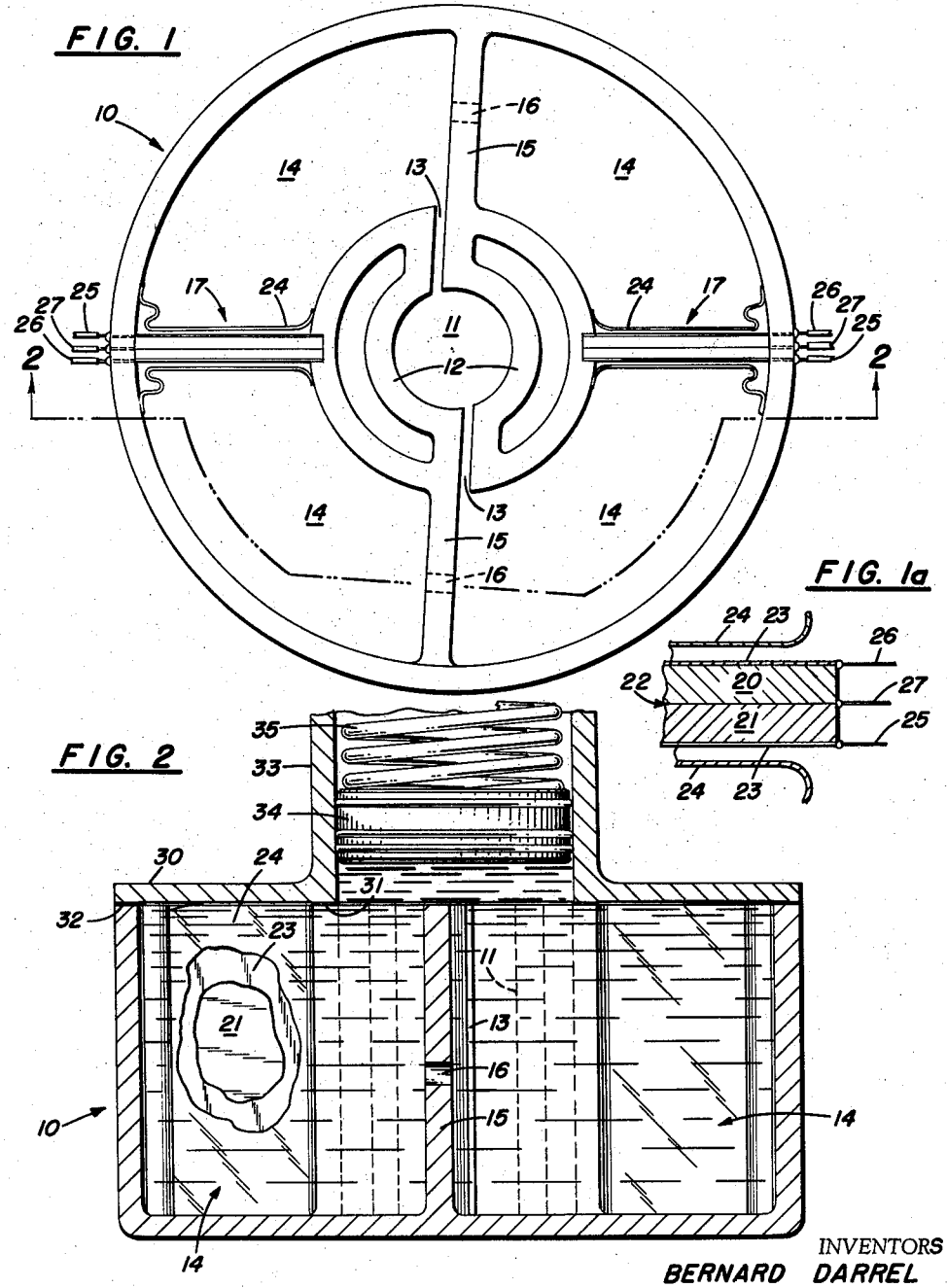

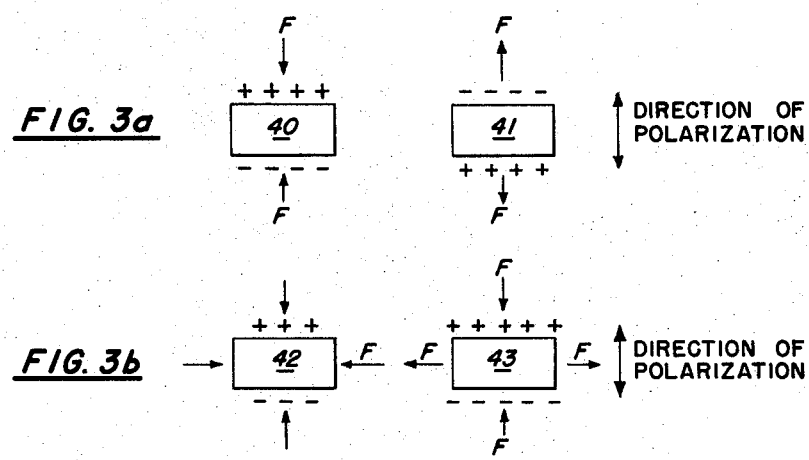
FIG. 3a
FIG. 3b
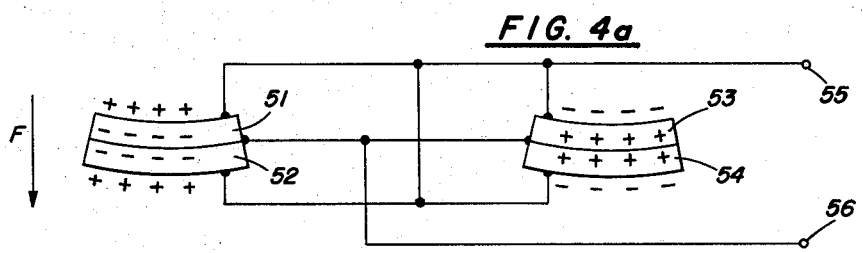
FIG. 4a
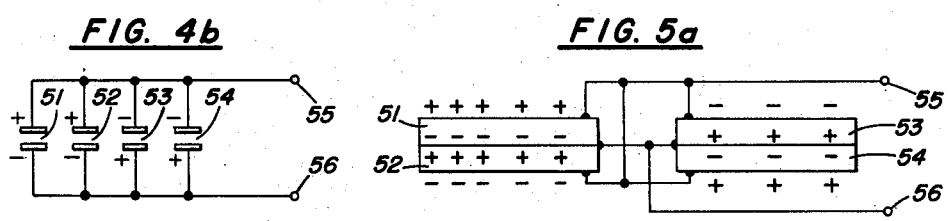
FIG. 4b    FIG. 5a
FIG. 5b
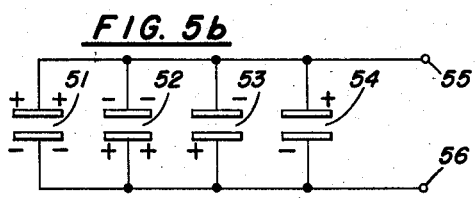
INVENTORS
BERNARD DARREL
PAUL B. BOSWELL
ATTORNEYS

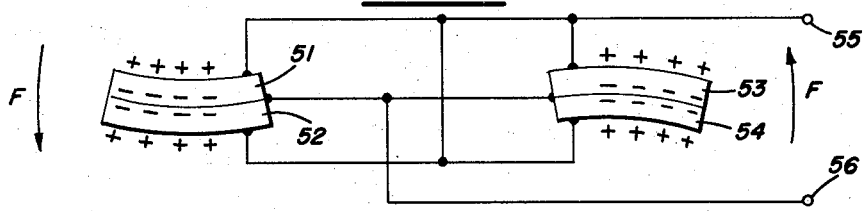
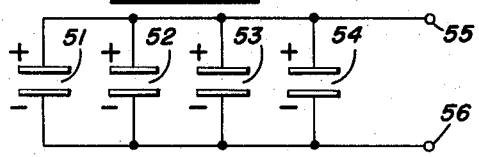
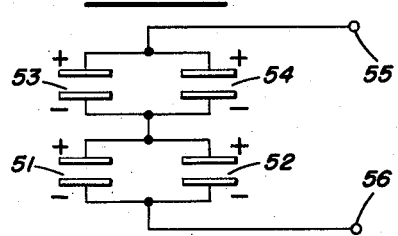
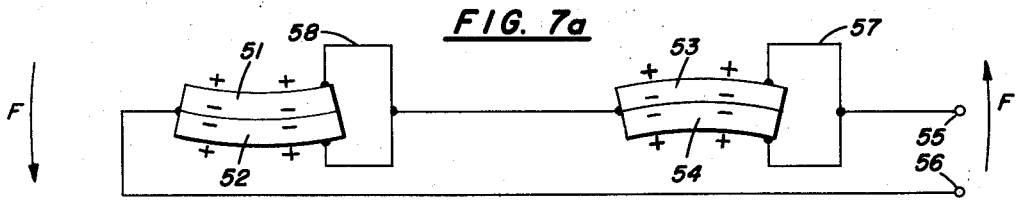
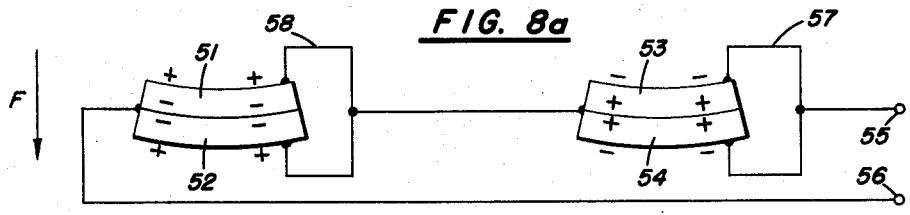
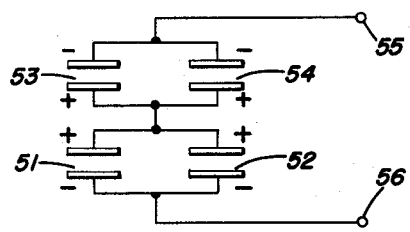
INVENTORS
**BERNARD DARREL
PAUL B. BOSWELL**

3,147,391
ANGULAR ACCELEROMETER
Bernard Darrel and Paul B. Boswell, Pittsfield, Mass., assignors, by mesne assignments, to the United States of America as represented by the Secretary of the Navy
Filed Mar. 27, 1961, Ser. No. 98,725
7 Claims. (Cl. 310—8.4)

This invention relates to an angular accelerometer and more particularly to an angular accelerometer utilizing mercury as an inertial mass.

Recent developments in the field of guided missile technology have required refinements to an extreme degree in many related arts and sciences. One such science, which is of immeasurable importance in the missile field and particularly in those types of missiles referred to as intercontinental ballistic missiles, is that science known as missile guidance. The newer and larger missiles which are presently being developed and which often exhibit range characteristics in excess of five thousand miles are found to incorporate systems of a highly sophisticated nature. With increasing range and missile complexity resort is had more often than not to guidance methods utilizing an inertial system. Systems of this nature have proved far superior to methods of missile guidance based on radio control, beam following, target homing and the like which are dependent on an external signal for directing the missile to the target. It is obvious that any system utilizing external electro-magnetic radiation in any form is immediately susceptible to jamming and to any of a number of countermeasures whereby an enemy may misdirect or destroy the missile while it is in flight.

In contradistinction to the aforementioned guidance methods the inclusion of an inertial system enables a missile, by utilizing its internal computing circuits, to determine its position at any time relative to its launch point and thus determine the direction and distance to a predetermined target area. It will be appreciated that a system of this nature requires extraordinarily precise measurement of all external forces acting on the missile body. In effect, a form of dead reckoning is utilized to ascertain the position of the moving body at any instant of time. At initial point, the launch point, is considered to be the origin of a coordinate system in which the missile is moving and precise measurements of all movement within that coordinate system are made and integrated to provide the instant position. It is customary to utilize a combination of stable platforms and accelerometers to accomplish the desired measurements which form the basis for computation of missile velocity and position, and which in turn are utilized to develop correction signals which actuate the propulsion system so as to compensate for deviations in the preplanned flight path. Stable platforms are utilized to provide the reference axes within an inertial system while accelerometers are utilized to measure both linear and angular acceleration, which when integrated once will give instantaneous velocity and on a second integration will indicate the position of the missile in space relative to a starting origin. Inasmuch as an accelerometer functions in accordance with the Newtonian laws of motion it produces an output signal when a force acts on a mass such that its velocity or direction is modified.

One problem that has presented itself with unflagging regularity is that of separating angular acceleration from linear acceleration and in accomplishing this desired purpose without large, bulky, cumbersome or fragile measuring instruments. It will be immediately appreciated that an accelerometer designed for application in a modern rocket powered missile must be able to withstand considerable physical shock which is normally attendant to its handling and launching. Furthermore, when such a device is launched from a field site, or from a mobile launching station such as a submarine, it is virtually impossible to maintain the large number of highly skilled engineering personnel that might be required to perform maintenance operations of more than the most rudimentary nature. Also to be considered are the high G stresses which are often applied to a missile at the time of launch. This is particularly important in an underwater launched missile which must traverse several hundred feet of sea water prior to broaching the surface and continuing on first a powered and secondly a ballistic course toward a predetermined target area.

The instant invention comprehends an angular accelerometer utilizing a mercury inertial mass which is included within a cylindrical casing and which, when acted on by angular acceleration, will deform bonded piezoelectric crystal pairs in such a way that an electrical output signal will be produced, which signal is proportional to, and indicative of, the angular acceleration forces acting thereon. The present invention, is insensitive to any and all linear acceleration forces due to its particular construction. As will be shown in greater detail hereinafter all moving parts, aside from the mercury mass, have been eliminated thus providing a considerable increase in reliability.

The solution of the problem of measuring angular acceleration, as solved by the prior art, has generally required the use of delicate suspension and pivoting structures for providing rotation of an inertial mass. This has resulted in attendant problems of maintaining low friction bearings and insulating the system from violent shocks. Additional problems have been presented due to the mechanical hysteresis of the inertial mass and in many instances the use of a magnetic type transducer to produce an output signal has resulted in a certain degree of insensitivity because of the conversion inefficiency inherent in changing mechanical energy to electrical energy.

It is therefore an object of the present invention to provide an improved angular accelerometer.

Another object is to provide an angular accelerometer insensitive to linear acceleration forces.

Still another object is to provide an accelerometer with a relatively rugged construction.

Another purpose is to provide an angular accelerometer utilizing neither suspended nor rotating mechanical parts.

Yet another object is to provide an accelerometer with a high signal to noise ratio.

Other objects and many of the attendant advantages of this invention will be readily appreciated as the same becomes better understood by reference to the following detailed description when considered in connection with the accompanying drawings wherein:

FIG. 1 is a top view of one embodiment of the instant angular accelerometer with the top cover removed;

FIG. 1a is an enlarged view of the crystal structure of FIG. 1;

FIG. 2 is a cross section view along a line substantially corresponding to line 2—2 of the embodiment illustrated in FIG. 1;

FIG. 3a is a schematic representation of the charge configuration on a piezoelectric crystal subjected to compression or tension forces;

FIG. 3b is a schematic representation of the crystal illustrated in FIG. 3a with the addition of compression and tension forces acting on the sides thereof;

FIG. 4a is a pictorial illustration of one crystal connection utilized in the instant invention to eliminate linear acceleration effects and is shown subjected to a lateral acceleration force;

FIG. 4b is a schematic representation of the equivalent electrical circuit for the configuration illustrated in FIG. 4a;

FIG. 5a is a pictorial representation of transverse acceleration forces on the crystal connection illustrated in FIG. 4a;

FIG. 5b is a schematic representation of the equivalent electrical circuit illustrated in FIG. 5a;

FIG. 6a is a pictorial representation of the effect of angular acceleration on the crystal connection illustrated in FIG. 4a;

FIG. 6b is a schematic representation of the equivalent electrical circuit for the configuration shown in FIG. 6a;

FIG. 7a is a pictorial representation of the effect of angular acceleration on a second crystal connection configuration;

FIG. 7b is the electrical equivalent circuit for the configuration shown in FIG. 7a;

FIG. 8a is a pictorial representation of the effect of lateral acceleration on the crystal configuration shown in FIG. 7a;

FIG. 8b is a schematic representation of the electrical equivalent circuit for the condition shown in FIG. 8a;

FIG. 9a is a pictorial representation of the crystal configuration of FIG. 7a when acted on by transverse acceleration forces;

FIG. 9b is a schematic representation of the equivalent electrical circuit of FIG. 9a; and FIG. 10 is a transverse section of a second embodiment of an angular accelerometer utilizing a mercury inertial mass and a single piezoelectric crystal.

Referring now to the drawings and more particularly to FIG. 1 wherein is illustrated one embodiment of an angular accelerometer using mercury as an inertial mass acting on a piezoelectric crystal, a cylindrical chamber 10 is shown with its upper cover removed. Contained within the cylindrical chamber 10 is a central chamber 11 of relatively smaller diameter, which chamber is formed by two semicircular members 12 radially disposed about the center point of chamber 10. The central chamber 11 and the larger outer cylindrical chamber 10 are connected by means of two openings 13 formed by the radially positioned semicircular members 12. The outer portion of the cylindrical chamber 10 is roughly divided into four quadrants 14 by separating means disposed along two diameters of the cylindrical chamber. One of these diameters includes wall members 15 extending respectively from each of the semicircular inner members 12 to the outer cylindrical chamber 10, each wall member containing an orifice 16 therein for purposes which will be described hereinafter. The second of the aforementioned diameters of the cylindrical chamber, which is disposed approximately perpendicular to the first of said diameters, also extends radially from semicircular inner members 12 to the periphery of the outer cylindrical chamber 10, and comprises bonded piezoelectric crystal assemblies 17 and their associated components which also will be more fully described hereinafter.

Quadrentially segmented cylindrical chamber 10 is filled with mercury or a similar fluid of high density which may be used as a liquid inertial mass. A cover plate 30, shown in FIG. 2, including a neck member 33, is attached to the top of cylindrical chamber 10 by any of a number of well known means. Gaskets 31 and 32 may be provided between cylindrical chamber 10 and cover plate 30 to effectuate a liquid tight seal. The mercury level is then raised up into neck member 33 on cover plate 30 so that a piston 34 when actuated by pressure means such as spring 35 shown in the illustration, or any other suitable method of applying pressure thereto, will force the piston 34 in a downward direction and maintain a positive pressure on the mercury in central chamber 11, which pressure is transmitted through connecting opening 13 and through damping orifices 16 into the four quadrential chambers 14 contained within the main cylindrical chamber.

The bonded crystal assembly and its associated components may be more thoroughly understood by referring to FIG. 1a wherein is shown an enlarged view of the crystal assemblies 17. It will be observed that each crystal assembly comprises a first crystal 20 and a second crystal 21 placed in juxtapositioned relationship such that, after proper preparation, their adjacent surfaces may be bonded together to form an interface connection. The particular relationship between these two crystals will be described below. However, for the present, it suffices to mention that they are connected so as to form a bond at the interface 22. The outer surfaces of the crystal configuration are coated with a metallic foil 23 which allows any charge accumulating thereon to be put to some useful work. A non-conducting flexible diaphragm 24 is next positioned adjacent the metallic foil so that the mercury contained within quadrential chambers 14 will not short out the crystal surfaces. An electrical connection 25 and 26 is made to each of the two surfaces coated with the metal foil and a third connection 27 is made with the interface connection resulting in three electrical conductors attached to the crystal pair and extending therefrom. The crystal pair is mounted by any suitable means such as, for example, indentations machined in the cylindrical chamber and the inner semicircular members, so positioned to maintain the crystal assembly therebetween and form a liquid tight seal between adjacent quadrential chambers.

In order to more fully understand the operation of the instant invention, it will be helpful to consider briefly the operation of a simple crystal such as, for example, barium titanite, when subjected to a force, either compression or tension, such as to cause a deformation in the crystal structure. Two such crystals are illustrated in FIG. 3a, the one on the left, 40, being subjected to a compression force and the one on the right, 41, being subjected to a tension force. The surface electronic charge is symbolically represented by a number of positive or negative signs which are numerically indicative of the relative charge magnitude which could be expected. It will be observed that in the case of either compression or tension forces one surface of the crystal is positively charged while the opposite surface contains a negative charge. However, the relative polarity of a particular surface is a function of the type of force applied thereto. In effect, the crystal itself exhibits a polarity which is a function of the internal crystal lattice structure, the sense of which is determined by the type of force applied and the direction of the field it was originally polarized. The particular forces applied to the crystal shown in FIG. 3a are parallel to the direction of crystal polarization. However, such direction of force application is not a requisite for surface polarization as is exhibited by the crystal shown in FIG. 3b wherein is illustrated a simultaneous application of forces in the direction of polarization and perpendicular thereto. It will be noted that in FIG. 3b both the left, 42, and right, 43, crystals are subjected to a compression force in the direction of polarization.

However, the left hand crystal is also subjected to a compression force perpendicular to the polarization direction while the right hand crystal is subjected to a tension force in said perpendicular direction. It will be noted that, as is shown in the left hand figure, when the two perpendicular forces are of the same sense, that is, both compression or both tension, the net effect is to reduce the magnitude of the surface charge. When the perpendicular forces are of opposite sense, as is shown in the right hand illustration, the net effect is to increase the total surface charge.

When it is desired to prepare a crystal assembly for use in the instant invention, two matched crystals are selected and then bonded together in a back to back position such that when a force is applied to the crystal pair in a direction normal to the flat sides, the two surfaces in contact, that is the interface connection, will exhibit electrical charges of the same polarity and the two outer surfaces, to which the metal foil is attached, will also have like surface charges but opposite to that maintained on the interface connection. For proper operation of the instant accelerometer it is desired that the two crystal pairs positioned at opposite sides of the large cylindrical chamber be matched in relation to each other such that a similar force applied to each crystal will result in a similar change thereon.

It is to be understood that a pair of crystals may be assembled in a back to back relationship as described above such that the outer surface thereof will display either a positive or a negative surface charge when subjected to a given type of stress. That is, when a crystal pair is subjected to either tension or compression forces the outer surfaces may be selected to exhibit either a negative polarity or a positive polarity while the interface will be the reverse thereof, although the particular polarity is dependent on the type of force applied. When it is desired to practice the instant invention the crystal assemblies will be bonded together in such a manner, and inserted into the accelerometer structure, so that for the application of forces to each crystal assembly in a direction shown by the arrow marked "F" in FIG. 4a, each crystal pair will develop surface charges of like polarity on both sides of the particular crystal pair however the two pairs will exhibit charges of opposite polarity with respect to each other. Thus, one crystal pair may, for example, exhibit a positive surface charge on both of its outer faces while the other crystal pair exhibits negative charges on both of its outer faces when force is applied in the indicated direction.

One method of connecting the crystal pairs, when assembled in an accelerometer, so that the resultant output will indicate only angular acceleration is illustrated in FIGS. 4a, 5a and 6a wherein it will be noted that two crystal pairs, 51–52 and 53–54, are shown with connections from the outer surfaces and from the bonded interface junction thereof. The four outer surfaces are connected together and brought to one output terminal 55 while the two interfaces are connected to each other and to a second output terminal 56, thereby providing a way of utilizing any electrical charge generated thereon.

As was pointed out earlier, one of the problems encountered in the design of an accelerometer, and one of the problems solved by the instant invention, is the development of a method to distinguish between angular and linear acceleration forces. For purposes of this discussion it should be realized that while a linear acceleration force can act from any direction, all such forces may be resolved, by methods well known in the mathematical arts, to three simple force components each parallel to one of the three axes in a three dimensional cartesian coordinate system. For purposes of simplicity in this discussion the third axis will be ignored, however it is to be understood that the description of linear acceleration components along a lateral and a transverse axis would apply in the same manner to acceleration force components acting along a third dimensional axis.

First the effects of lateral acceleration will be considered, which for the proper functioning of an angular accelerometer must be eliminated therefrom. FIG. 4a illustrates a pair of crystal units assembled in the manner described for the instant accelerometer and subjected to a force in the downward direction as shown by the arrow. Inasmuch as the crystals 51, 52, 53 and 54 are assembled so that an application of forces to both pairs in a unitary direction will result in surface charges of unlike sign, the condition is that illustrated in FIG. 4a and is that which results from the application of a linear force to the entire accelerometer assembly in a lateral direction.

Illustrated in FIG. 4b is a schematic representation of the crystal configuration as shown in FIG. 4a. Each of the individual crystals 51, 52, 53 and 54 comprising the two crystal pairs are represented as capacitors bearing like numerals and electrical charges of the same polarity as that shown in the pictorial representation of FIG. 4a. It will be noted that crystals 51 and 52 appear as capacitors with like polarization while capacitors 53 and 54, representative of the crystals bearing the same numerals, are shown having like, but opposite polarity with respect to the first two mentioned capacitors. It will be easily seen that the two upper plates bearing a positive charge will be cancelled out by the two upper plates carrying negative charges while a similar result will occur with the four bottom capacitor plates thereby giving an output across terminals 55 and 56 of zero magnitude. Thus it may be seen that an application of a linear force, as illustrated, will result in a zero output signal from the accelerometer assembly.

The condition resulting from the application of a transverse force to the crystal pairs is illustrated in FIGS. 5a and 5b wherein it will be observed that such application to crystals 51, 52, 53 and 54 results in the accumulation of charge on the outer surface of each crystal pair having unlike signs but equal magnitudes. By referring to the schematic circuit of FIG. 5b it will be seen that, as in the former case, these surface charges are equally disposed on opposite capacitor plates so that they exactly balance out and produce, again, a zero output signal.

However, when the accelerometer is exposed to an angular acceleration the result is to apply a force to each crystal pair that operates in opposite directions resulting in crystal deformation in such a manner that the outer surfaces of both crystal pairs will bear like signs, the sense of which will be dependent on the direction of the angular force applied. For the direction of force that has been arbitrarily assumed for purposes of illustration, as shown in FIG. 6a, the surface polarities are all positive which results in an equivalent circuit, for the particular connections, as represented by the equivalent schematic shown in FIG. 6b. Each of the four crystals 51, 52, 53 and 54 will exhibit the characteristics of a capacitor with the upper plate charge positively and the lower plate charged negatively. These capacitors, being connected in parallel and charged to the same relative polarity, will produce an output voltage dependent in polarity on the direction of the acceleration force which has caused crystal deformation. To the extent that the acceleration force has not exceeded the limits of the crystal pairs, the voltage output will be proportional to the magnitude of the acceleration forces.

From the above description of one circuit configuration which may be utilized to practice the instant invention, it should be realized that the voltage output produced by the crystals contained within the angular accelerometer structure will be proportional to the magnitude of angular acceleration forces which acts to deform the crystal pairs in opposite directions but will be insensitive to any linear acceleration force acting on the crystal pairs from any direction. The angular acceleration forces that will be measured are those acceleration components existing in a plane normal to the central axis of the accelerometer structure. Thus, a combination of three of the instant angular accelerometers mutually disposed along the three axes of a cartesian coordinate system will indicate all angular acceleration forces acting within the system inasmuch as any and all such forces may be resolved into components acting within one of the three planes normal to each of the three mutually perpendicular coordinate axes of such a system.

A second possible method of connection of the crystal pair units is disclosed in FIGS. 7a, 8a and 9a. This circuit will also prove insensitive to any linear acceleration force but will generate an output signal proportional to the magnitude of an angular acceleration force acting on the system in the same manner as in the previous embodiment. It will be noted that in FIG. 7a, the outer surfaces of the two crystals 53 and 54, forming one of the crystal pairs, are connected together by lead 57 which is in turn connected to one of the output terminals 55. The outer surfaces of second crystal pair combination 51 and 52 are connected together in a like manner by lead 58 which is in turn connected to the interface junction between the first crystal pair combination 53 and 54. The interface junction between the second of these crystal pairs 51 and 52 is connected to output terminal 56.

By reference to the equivalent circuit for this configuration as shown in FIG. 7b, which illustrates the condition existing when an angular acceleration force is applied and the crystals are deformed in opposite directions, it will be noted that the equivalent representation consists of two pairs of capacitors connected in series with the capacitors of each pair being connected in parallel. The first pair of capacitors 53 and 54 exhibit one polarity while the second pair of capacitors 51 and 52 exhibit the same relative polarity with respect to the output terminals 55 and 56 resulting in an output signal proportional to the magnitude of charge contained on the equivalent capacitors. It will be noted that in the circuit described in connection with this figure, the equivalent voltage appearing across the terminals 55 and 56 is double the magnitude of that found in the previous embodiment inasmuch as two pairs of parallel connected capacitors are connected in series while in the previous embodiment shown in FIG. 6b all four capacitors were connected in parallel.

The operation of the instant embodiment, when affected by a linear acceleration force in a lateral direction, is illustrated in FIG. 8a where it will be noted the crystal pairs are deformed in the same direction relative to one another as distinguished from the condition illustrated in FIG. 7a wherein crystal pairs were deformed in opposite directions. The equivalent circuit for this type of linear acceleration is illustrated in FIG. 8b wherein it will be noted that the four capacitors are now charged such that the upper pair 53 and 54, representative of one of the crystal pair combinations, have polarities relative to output terminals 55 and 56 which are opposite in magnitude to the charge contained on equivalent capacitors 51 and 52, representative of the other crystal pair, resulting in charge cancellation and thus a zero output voltage.

When the above configuration is exposed to a linear acceleration acting transversely to the crystal structure, as illustrated in FIG. 9a, each crystal pair will exhibit on its outer surface charges of equal but opposite magnitude with the relative polarity of one crystal pair being reversed with respect to that of the other similar pair. Again utilizing the same circuit configuration as illustrated in FIG. 7a, it will be noted that the equivalent circuit shown in FIG. 9b for lateral acceleration forces depicts the condition wherein crystal 51 is represented as a capacitor having one polarity of charge contained thereon while crystal 52 contains a charge of the same magnitude but of opposite polarity crystals 53 and 54, inasmuch as they, in the equivalent circuit representation, may be considered as two identical capacitors connected in parallel, each contain like charges of opposite polarity. The net result is that the charge contained on each capacitor pair, being equal in magnitude but opposite in polarity, cancels out and gives a zero net voltage output for both capacitor pairs thereby resulting in a total output voltage for the entire configuration of zero magnitude.

For the reasons above described the angular accelerometer, when acted upon by acceleration forces rotational in nature, will generate an output voltage proportional to the magnitude of the force causing crystal deformation but will be insensitive to linear acceleration forces impinging on the crystal configuration from any arbitrary direction.

As was pointed out in connection with the description of FIG. 1, a fluid of heavy density, shown in the particular embodiment described herein as mercury, is utilized to provide an inertial mass responsive to acceleration forces to which the system is exposed. The use of a fluid such as mercury provides several advantages inasmuch as the fluid mass will rotate within the cylindrical outer chamber 10 without requiring the usual delicate suspension and pivoting structures which are normally required to provide for the rotation of a solid mass. The use of a liquid also provides an answer to the problem of mechanical hysteresis, which is often difficult of solution in the more conventional accelerometers utilizing a solenoid type operation.

A piezoelectric crystal of the type employed herein has very little internal friction and consequently contributes little to damping. The viscosity of mercury is approximately that of water and, therefore, the viscous shear damping is also very small. It has been determined, however, that the provision of an orifice 16 within wall member 15, as shown in FIG. 1, will provide more than adequate damping to keep the system from oscillating. Orifice type damping is particularly appropriate for a system utilizing mercury inasmuch as the damping is proportional to the density of the liquid, which is high for mercury.

As shown in FIG. 2, the mercury is maintained under positive pressure by means of a piston 34 contained within the cover opening 33 so as to prevent the mercury from sloshing around the crystal structure. This also tends to remove the effects of linear acceleration inasmuch as movement within the outer cylindrical chamber by the mercury contained therein is a prerequisite for any crystal deformation and the attendant indication of an acceleration force acting thereon. The more nearly the mercury is maintained immobile, other than for angular rotation, the less effect any linear acceleration will have on the system. It is to be realized, however, that to the extent that mercury is not maintained in a linearly immobile condition, the effects of crystal deformation resulting from such mercurial movement will be cancelled out by the particular crystal connections described herein.

A second embodiment of the angular accelerometer utilizing a single crystal pair as an indicator of acceleration forces is illustrated in FIG. 10 wherein it will be observed that a cylindrical chamber 10 is provided similar to that shown in the embodiment of FIG. 1. Centrally positioned within the chamber 10 are provided two semicircular members 12 so as to form a central chamber 11 of the same nature as that illustrated in FIG. 1. A single crystal pair combination 17 is provided and extends radially from one of the semicircular members 12 outwardly toward the cylindrical chamber 10. Two wall members 15, including damping orifices 16, are radially positioned between members 12 and the cylindrical chamber 10 so that they are disposed to form approximately an angle of 120° with respect to each other and with respect to the single crystal pair positioned within the chamber. The cylindrical chamber 10 is constructed of relatively heavy material so as to withstand a high internal pressure. Similarly to the condition described previously, chamber 10 is filled with mercury, which then by suitable means, not illustrated, is maintained under a high pressure. It should be realized that a fluid such as mercury being relatively incompressible will, when subjected to linear acceleration forces, have little or no effect on the single crystal member inasmuch as a pressure tending to deform the crystal in one direction will be counteracted by an essentially equal and opposite pressure in the reverse direction. However, when exposed to rotational forces the mercury will still tend to rotate within the cylindrical chamber in a direction opposite to that of the angular acceleration applied. The orifices 16 in wall members 15 permit a damped flow of mercury from chamber to chamber so that the only restraint on mercury movement is that of the crystal pair member and thus the mercury, as the outer chamber is accelerated in a rotational direction, will deform crystal pair member 17 so as to generate a signal indicative of the direction of angular acceleration and proportional to its magnitude.

It should be realized, that for situations where the utmost accuracy is not required, a simpler accelerometer of the type described in the above embodiment may be employed as a miniaturized component having certain advantages over the larger, slightly more complex embodiment of FIG. 1.

Obviously many modifications and variations of the present invention are possible in the light of the above teachings. It is therefore to be understood that within the scope of the appended claims the invention may be practiced otherwise than as specifically described.

What is claimed is:

1. An angular accelerometer comprising in combination a fluid mass, a container therefor, separation means dividing said container into a plurality of chambers, at least one of said separation means comprising a pair of matched stress responsive piezoelectric crystals for producing an electrical voltage corresponding to angular acceleration forces imparted to said fluid mass, each of the matched crystals in said piezoelectric crystal pairs being electrically connected to its matching crystal so that any charge in one of said crystals produced by a linear force being applied thereto will be cancelled by an equal and opposite charge on its matching crystal, and output means electrically connected to said crystal pair so that an output voltage resulting from a charge on said crystal pair due to angular acceleration is utilized to indicate the magnitude of the angular acceleration.

2. An angular accelerometer comprising in combination a high density fluid mass, a cylindrical container therefor, separation means dividing said container into quadrential chambers, two of said separation means comprising matched piezoelectric crystal pairs disposed along a diameter of said container for producing an electrical voltage corresponding to angular acceleration forces imparted to said fluid mass, each of the piezoelectric crystals in said crystal pairs being electrically connected to its matching crystal so that any charge in one of said crystals produced by a linear force applied thereto will be cancelled by an equal and opposite charge on its matching crystal, whereby the only output voltage from said crystal pairs is produced by an angular acceleration on said cylindrical container.

3. An angular accelerometer comprising in combination a fluid mass, a container therefor, two electrically connected deformable crystal pairs; said two crystal pairs being positioned in plane approximately forming a diameter of said chamber with one pair rigidly mounted on either side of the center of said container, said crystal pairs comprising matched stress responsive piezoelectric crystals, each of said matched piezoelectric crystals in said crystal pairs being electrically connected to its matching crystal so that any charge in one of said crystals produced by a linear force being applied thereto will be cancelled by an equal and opposite charge on its matching crystal whereby an output signal will be developed only when said container is subjected to an angular acceleration force.

4. An angular accelerometer comprising in combination a cylindrical container, first separation means disposed along a diameter of said container comprising matched piezoelectric crystal pairs, each of the matched piezoelectric crystals in said crystal pairs being electrically connected to its matching member so that any charge in one of said crystals produced by linear force being applied thereto will be cancelled by an equal and opposite charge on its matching crystal whereby only charges on said crystal pairs resulting from an angular force being applied to both crystal pairs will result in an output signal indicative of the angular force, separation means forming wall members disposed along a second diameter of said container, each of said wall numbers containing an orifice therein, a high density fluid mass filling said container for imparting stresses to said crystals proportional to angular accelerations imparted to said container.

5. An angular accelerometer comprising in combination a high density fluid mass, a cylindrical container therefor, separation means dividing said container into quadrential chambers, two of said separation means each comprising matched piezoelectric crystal pairs disposed approximately along a diameter of said container, each of said crystal pairs comprising two simple crystals mounted in juxtapositioned back to back relationship so that when subjected to a linear force normal to their surface the outer sides will develop like electrical charges, each of said matched piezoelectric crystals in said crystal pairs being electrically connected to its matching crystal so that any charge in one of said crystals produced by linear force being applied thereto will be cancelled by an equal and opposite charge on its matching crystal whereby only charges resulting from an angular force being applied to both crystal pairs will result in an output signal.

6. An angular accelerometer comprising in combination an incompressible fluid mass, a cylindrical container therefor, a radially extending crystal pair positioned between the center and the periphery of said chamber, said crystal pair comprising two matched piezoelectric crystals mounted in juxtapositioned back to back relationship so that when subjected to a linear force normal to their surface the outer sides will develop like electrical charges, each of the matched piezoelectric crystals in said crystal pair being electrically connected to its matching crystal so that any charge in one of said crystals produced by a linear force being applied thereto will be cancelled by an equal and opposite charge on its matching crystal, a plurality of wall members, each containing an orifice therein, extending from the center to the periphery of said chamber so positioned that, in cooperation with said crystal pair, a number of radial symmetrical chambers are formed in said chamber, means for maintaining said fluid under pressure in said container, said crystal pair being disposed in said chamber so that an angular acceleration imparted to said container will move said crystal pair against the inertial resistance of said fluid mass resulting in deformation of said crystal pair thereby generating an output signal indicative of said angular acceleration, and output means for measuring the charge on said crystal pair to thereby indicate the angular acceleration of said container.

7. In a device for measuring angular acceleration the combination comprising; an enclosed container, a high density fluid mass disposed within said container, separation means dividing said container into a plurality of chambers, said separation means comprising at least one pair of support members positioned in a plane forming a diameter of said container and extending along the longitudinal axis of said container, and at least one pair of matched stress responsive piezoelectric crystals forming further separation means for said container, said pair of piezoelectric crystals being mounted in juxtapositioned back-to-back relationship so that when subjected to a linear force normal to their surface the outer sides of said crystals will develop like electrical charges, each of said matched piezoelectric crystals in said crystal pair being electrically connected to its matching crystal member so that any charge in one of said crystals produced by a linear force being applied thereto will be cancelled by an equal and opposite charge on its matching crystal, said high density fluid mass within said container being adapted to apply force to said pair of piezoelectric crystals when said container is subjected to angular acceleration, pressure means operably connected to said container for maintaining pressure on said fluid mass whereby the inertial resistance of said fluid mass to an angular acceleration of said container will cause said fluid mass to deform said crystal pair thereby generating an output signal indicative of an angular acceleration, and output means connected to said crystal pair for measuring the charge on said crystal pair to thereby indicate the angular acceleration of said container.

References Cited in the file of this patent

UNITED STATES PATENTS

| | | |
|---|---|---|
| 2,880,333 | Dranetz | Mar. 31, 1959 |
| 2,949,782 | Stedman | Aug. 23, 1960 |